Patented Jan. 21, 1947

2,414,769

UNITED STATES PATENT OFFICE 2,414,769

MIXED DIALKYL PEROXIDES

Frederick F. Rust, Berkeley, and Frank H. Dickey, Oakland, Calif., assignors to Shell Development Company, San Francisco, Calif., a corporation of Delaware No Drawing. Application August 28, 1943
Serial No. 500,454

5 Claims. (Cl. 260—610)

The present invention relates to a novel class of compounds comprising certain mixed organic peroxides. More specifically stated, the invention pertains to the preparation of a class of mixed tertiary peroxides of the general formula R—O—O—R' wherein R represents a tertiary organic radical, i. e. an organic grouping containing not less than four carbon atoms, one of said carbon atoms being directly attached to the oxygen atom of the peroxy (—O—O—) radical as well as to three other carbon atoms, and wherein R' represents an organic radical in which the carbon atom directly bound to the oxygen atom is non-tertiary, i. e. has not more than two carbon atoms directly attached thereto. In one of its more specific embodiments, the invention is directed to a novel group of mixed di-alkyl peroxides in which one of the alkyl radicals attached to the peroxy radical is a substituted or unsubstituted aliphatic tertiary radical, i. e. containing not less than four carbon atoms of aliphatic character, one of said carbon atoms being directly bound to the peroxy oxygen atom as well as to three other carbon atoms, while the other alkyl radical (which is attached to the other of said peroxy oxygen atoms) is non-tertiary, and is preferably a saturated primary alkyl radical. In other words, the second-mentioned aliphatic radical is preferably attached to the oxygen atom by a carbon atom which is attached to not more than one other carbon atom.

It has recently been proposed to produce symmetrical di(tertiary alkyl) peroxides by a controlled non-explosive oxidation of hydrocarbons containing at least one tertiary carbon atom of aliphatic character, this oxidation being effected with oxygen, in the presence of certain catalysts such as hydrogen bromide, and at elevated temperatures which, however, are below those at which spontaneous combustion of the mixture occurs. For example, the treatment of substantially equivolumetric amounts of isobutane and oxygen, in the presence of hydrogen bromide at a temperature of between about 150° C. and about 200° C., resulted in the oxidation of the isobutane with the resultant formation of di(tertiary butyl) peroxide. Similarly, other di(tertiary alkyl) peroxides may be formed. It is to be noted, however, that the di-alkyl peroxides formed in accordance with the above process always contain two like tertiary radicals.

The present invention is predicated on the discovery that organic hydroperoxides in which the organic radical is directly attached to the peroxy (—O—O—) radical via a carbon atom which is also directly bound to three other carbon atoms may be reacted with certain esters described herein to produce the aforementioned di-peroxides in which one of the radicals is attached to one of the peroxy oxygen atoms via a non-tertiary carbon atom. More specifically stated, the invention resides in the preparation of novel peroxides by interacting a tertiary organic hydroperoxide of the formula

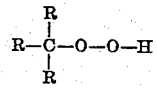

wherein each R represents a like or different organic radical, which radical may or may not be further substituted, with an ester and preferably a neutral ester formed by the interaction of a suitable inorganic acid, such as sulfuric acid, with a primary or secondary aliphatic alcohol, this interaction of the tertiary hydroperoxide with the mentioned esters being preferably effected at ordinary or sub-normal temperatures, and in the presence of a basic or basic-acting material, preferably an alkali or alkali-earth metal hydroxide. This method of preparation, which is of broad and general application, results in the preparation of the aforementioned and hereinbelow more fully described class of organic peroxides in which one of the oxygen atoms is directly attached to a carbon atom which is directly attached to three other carbon atoms, while the other oxygen is bound to an organic radical via a non-tertiary, preferably a primary, carbon atom.

Although the tertiary hydroperoxides employed as one of the reagents in the manufacture of the novel di-peroxides may be produced by the use of several different processes, an advantageous method of preparing these hydroperoxides such as tertiary butyl hydroperoxide comprises the controlled, non-explosive, catalytic oxidation of the corresponding hydrocarbon containing at least one tertiary carbon atom of aliphatic character, this oxidation being effected, for example, in the presence of hydrogen bromide and under conditions of temperature, pressure and residence time which favor the formation of the particular tertiary hydroperoxide. This method of preparing the hydroperoxides, besides the simplicity and relative cheapness of operation and of the reactants, possesses the additional advantage of forming a reaction mixture which may be directly reacted with the esters in accordance with the process of the present invention, without the necessity of conducting any preliminary, costly and time-consuming treatment of such reaction mixture to separate therefrom the tertiary hydroperoxide.

Another method of producing a tertiary alkyl hydroperoxide, such as tertiary butyl hydroperoxide, includes the step of treating a tertiary alkyl alcohol with aqueous hydrogen peroxide in the presence of a dehydrating agent of the type of anhydrous sodium sulfate. Still another method comprises the formation of an acid monoalkyl hydrogen sulfate, e. g. the hydrogen sulfate formed by reacting isobutylene with aqueous sulfuric acid solution, reacting this mono-alkyl sulfate with hydrogen peroxide, neutralizing the resulting reaction product, and recovering the hydroperoxide (which is tertiary butyl hydroperoxide when isobutylene is one of the starting materials).

Although tertiary alkyl hydroperoxides, which are employed as one of the starting materials in the production of the novel mixed peroxides according to the present process, may be produced by the last two described methods, these methods of producing the hydroperoxides are less economical than the aforementioned process which comprises the controlled non-explosive oxidation of hydrocarbons, and particularly saturated hydrocarbons containing a tertiary carbon atom, with oxygen in the presence of hydrogen bromide. This is due to the relatively high cost of hydrogen peroxide, and because the two mentioned processes which use hydrogen peroxide as a starting material necessitate further treatment of the reaction products to separate therefrom the tertiary hydroperoxide, e. g. tertiary alkyl hydroperoxide, substantially in a pure state prior to its interaction with the esters of inorganic acids to produce the novel mixed peroxides constituting one phase of the present invention.

The following are illustrative examples of tertiary alkyl hydroperoxides which may be formed, for example, by the aforementioned controlled oxidation, and which may be used as one of the reactants in the manufacture of the novel mixed di-alkyl peroxides in accordance with the process of the present invention: tertiary butyl hydroperoxide, tertiary amyl hydroperoxide, and their homologues and analogues, such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl butane, and their homologues. Also, suitable substitution products, such as the tertiary alkyl hydroperoxides in which a halogen atom or atoms are attached to one or more of the carbon atoms (other than the one carrying the hydroperoxyl radical), may be reacted with the ester or salts of the inorganic acids to produce the novel mixed peroxides. Such halo-substituted tertiary hydroperoxides may be obtained, for example, by the controlled oxidation with oxygen, in the presence of hydrogen bromide, of halogenated saturated aliphatic hydrocarbons of the type of 1-halo-2-methyl propane, 1-halo-2-ethyl propane, 1-halo-2-methyl butane, 1-halo-3-methyl butane, 2-halo-3-methyl butane, and the like. Still another group of hydroperoxides which may be thus employed in the process of the present invention includes compounds wherein one or more of the aliphatic radicals attached to the tertiary carbon atom (which is directly attached to the peroxy radical) is substituted by or contains attached thereto an aryl, alkaryl, aralkyl and/or alicyclic radical, which may or may not be further substituted.

It was stated above that the novel peroxides may be formed according to the present process by an interaction of a hydroperoxide, particularly a tertiary alkyl hydroperoxide, with an ester or salt formed by the interaction of an acid with an alcohol. Although any alcohol may be used to produce these esters or salts, the process is especially suitable when applied to the use of salts formed from a non-tertiary, and particularly from a primary, aliphatic alcohol. These esters or salts may be formed by reacting the alcohol with various concentrations of different inorganic acids, such as sulfuric acid, phosphoric acid, hydrochloric acid, hydrobromic acid, or even silicic or boric acids. Also, although the acid salts may be used, in order to produce satisfactory yields of the desired mixed peroxides, such as those wherein one of the radicals attached to the peroxy radical is tertiary, while the other is a non-tertiary, preferably a primary radical, it is generally preferred to employ the neutral esters, such as the neutral ester formed by a complete esterification of sulfuric acid with the aforementioned non-tertiary alcohol. Di-methyl sulfate, di-ethyl sulfate, di-isopropyl sulfate, the corresponding acid sulfates, as well as their homologues and analogues and the corresponding esters of other inorganic acids, are illustrative examples of the esters or salts which may be used as an ingredient to be reacted according to the present process with the hydroperoxide (tertiary alkyl hydroperoxide) to form the desired novel products.

The method of preparing the mixed peroxides of the present invention is quite flexible with reference to the catalyst to be used. Generally speaking, the reaction may be effected in any alkaline medium, i. e. in the presence of any basic or basic-acting material. It is preferred, however, to use strong alkalies, such as the hydroxides of alkali or alkaline earth metals. When resort is had to a strong alkali, it is preferred to operate with potassium hydroxide or sodium hydroxide, preferably in the form of their aqueous solutions. For instance, when a tertiary alkyl hydroperoxide is to be reacted with a neutral ester or salt of sulfuric acid and a primary alcohol, e. g. methyl, ethyl, n-propyl or n-butyl alcohol, it was found that satisfactory yields of the desired novel mixed or asymmetrical peroxides are obtained by the use of aqueous potassium hydroxide solutions of between 20% and 50% strength. However, in certain instances it may be desirable, or even preferable, to operate with stronger or weaker solutions of this or other basic or basic-acting substances.

It was pointed out above that although acid salts, e. g. an alkyl hydrogen sulfate, may be used as one of the reactants, it is preferred to employ the neutral esters. Since the reaction is effected in the presence of a basic or basic-acting material, a portion of this material would react with the acid salt if the latter were used, particularly if the basic material were to be a strong alkali. It is for this reason that the process should be preferably effected by using the neutral salts of a suitable acid, e. g. an inorganic acid, and of a non-tertiary alcohol, such as a saturated primary or secondary aliphatic alcohol.

The reaction between the hydroperoxides and the above-mentioned esters or salts may be effected in a batch, intermittent or continuous manner. Although this reaction may be executed within a relatively wide range of temperatures, in most cases, highly satisfactory yields of the mixed peroxides may be obtained by conducting the reaction at ordinary or room temperatures, and even at sub-atmospheric temperatures. In fact, when a tertiary alkyl hydroperoxide is reacted with a neutral ester formed from an inorganic acid, e. g. sulfuric acid, and a saturated primary aliphatic alcohol, excellent yields of the desired mixed peroxide will be obtained when the reaction is effected at temperatures of between about 0° C. and about 10° C. to about 20° C. Obviously, the optimum reaction temperature, as well as the optimum strength and amount of the basic or basic-acting material to be used, will depend at least in part on the specific reactants employed.

The novel class of compounds, which may be prepared in accordance with the above-outlined process, may be generally represented by the formula R—O—O—R', wherein R represents an organic grouping containing not less than four carbon atoms, one of said carbon atoms being directly attached to the oxygen atom of the peroxy (—O—O—) radical as well as to three other carbon atoms, and wherein R' represents an organic radical or grouping in which the carbon atom directly bound to the other of the mentioned oxygen atoms of the peroxy radical is non-tertiary. A preferred subclass of these novel compounds may be represented by the general formula

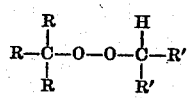

wherein each R represents a like or different unsubstituted or substituted alkyl radical, and wherein each R' represents a hydrogen atom or a like or different unsubstituted or substituted alkyl radical. A particular sub-group comprises the asymmetrical di-alkyl peroxides in which one of the two alkyl radicals is a substituted or unsubstituted saturated alkyl radical which is directly attached to one of the peroxy oxygen atoms by means of a tertiary carbon atom of aliphatic character, while the other alkyl radical (attached to the other of said peroxy oxygen atoms) is a substituted or unsubstituted saturated non-tertiary, and preferably a primary, radical. Compounds which fall within the last-mentioned sub-group include the peroxides in which one of the radicals attached to the peroxy radical is a tertiary butyl, tertiary amyl, tertiary hexyl or a tertiary heptyl radical, or a higher homologue thereof, while the other radical is a saturated primary or secondary aliphatic radical, i. e. a methyl, ethyl, n-propyl, isopropyl, n-butyl, isobutyl, n-pentyl, n-hexyl, etc. radical. As stated above, the second-mentioned radical is attached to the peroxy oxygen atom by means of a non-tertiary, and preferably a primary, carbon atom of aliphatic character. The mixed peroxides of the present invention may have various substituents attached to the different carbon atoms of either or both radicals. For instance, one or more of the hydrogen atoms of a mixed di-alkyl peroxide may be substituted by one or more halogen atoms, hydroxyl groups and/or aryl, alkaryl, aralkyl and/or alicyclic radicals. A specific example of the above-defined sub-group of novel compounds is ethyl tertiary-butyl peroxide which, as will be shown, is formed by reacting tertiary butyl hydroperoxide with diethyl sulfate at a temperature of between about 0° C. and about 10° C. in the presence of potassium hydroxide. This new compound is a water-white liquid which is substantially immiscible with water. This peroxide is unaffected when washed with 65% sulfuric acid, and reacts quantitatively with concentrated hydrogen iodide solution, when heated to about 60° C. for one hour in acetic acid solution, to yield one mol of iodine per mol of the peroxide.

The following example illustrates one method of preparing the novel mixed peroxides, it being understood that there is no intention of limiting the invention to any specific details presented in said example or to the specific compound produced.

Approximately 15 parts by weight of diethyl sulfate were mixed with about 21.6 parts by weight of tertiary butyl hydroperoxide in an 83% aqueous solution. The mixture was chilled to approximately 0° C. by placing it in an ice bath. A solution of about 15 parts by weight of potassium hydroxide in 30 parts of water was then added in small portions with stirring and while maintaining the temperature of the solution at below about 10° C. Upon dilution with ice water, the mixture separated into two liquid phases. The upper phase was removed and washed with water. An analysis of this sample showed that it was 99% ethyl tertiary-butyl peroxide.

Substantially the same process may be used for the interaction of tertiary butyl hydroperoxide (or of its higher homologues, such as tertiary amyl hydroperoxide) with other salts of inorganic acids, e. g. methyl sulfate, propyl sulfates, etc., such a reaction causing the formation of the corresponding novel mixed peroxides of the class described above.

The properties possessed by the ethyl tertiary-butyl peroxide, as well as by the whole class of the above-defined novel organic peroxides, adapt them admirably for use in organic reactions as well as for other purposes. For example, these novel compounds may be used as additives to improve the cetane value of Diesel engine fuels. Also, these peroxides may be employed, individually or in admixture with one another or with other substances, as catalysts for various chemical reactions. For instance, they may be used as catalysts for the polymerization of polymerizable unsaturated compounds, including both the conjugated and the unconjugated unsaturated polymerizable compounds.

Although unsaturated organic compounds having a single polymerizable olefinic linkage, e. g. styrene, alpha-methyl styrene, many vinyl and allyl derivatives, and the nitriles and many esters of acrylic and alpha-substituted acrylic acids, all of which fall within the class of unconjugated unsaturated polymerizable organic compounds, may be effectively polymerized in the presence of the above-defined class of novel catalysts to produce resins and resin-like substances, nevertheless of growing importance for resins in another group of unconjugated unsaturated compounds having two or more polymerizable non-conjugated double bonds between carbon atoms of aliphatic character. Examples of these are the unsaturated aliphatic polyesters of saturated polybasic acids, the unsaturated aliphatic polyethers of saturated polyhydric alcohols, the unsaturated aliphatic organic acid polyesters of polyhydric alcohols, and the unsaturated aliphatic esters of unsaturated aliphatic acids. Also included in this class are the polymerizable unsaturated compounds containing in the molecule one or more polymerizable organic radicals and one or more inorganic radicals or elements. Examples of such compounds are the vinyl, allyl and methallyl esters of phosphoric acid and of the ortho acids of silicon, boron, etc.

Another important group of compounds which can be polymerized by the novel peroxides of the present invention consists of polymerizable compounds having two or more, and preferably two, conjugated unsaturated carbon-to-carbon linkages. These compounds are substantially hydrocarbon in character, although they may contain substituents, such as halogen, nitro, sulfo, etc. By far the most important sub-group of such compounds comprises the hydrocarbons and substituted hydrocarbons having in the molecule two double bonds in conjugated relationship with one another, these double bonds being between carbon atoms of aliphatic character. Representative examples of such compounds are butadiene-1,3, 2-chlor-butadiene-1,3, isoprene, and the higher homologues thereof. In general, the polymerization of conjugated diene hydrocarbons and substituted hydrocarbons in accordance with the invention results in products which are synthetic elastomers in character and, as a consequence, belong to the general group of substances known as synthetic rubbers.

The invention in one of its phases is applicable to the polymerization of single compounds of the above-outlined groups and to the co-polymerization of two or more compounds. For example, in the production of compounds which are synthetic elastomers in character, one or more of the conjugated diene hydrocarbons may be polymerized in accordance with the process described herein, and in the presence of the novel peroxide catalysts, with one or more of the polymerizable unsaturated compounds of the type of styrene, acrylonitrile, isobutylene, vinyl chloride, methyl methacrylate, and the like. Synthetic resins usually require the addition of one or more plasticizers, stabilizers, lubricants, dyes, pigments, fillers, or other modifiers. Where these modifiers do not chemically react with or otherwise adversely affect the ingredients of the reaction mixture, they may be added to the monomer, or to the partially polymerized material during the polymerization reaction.

The novel peroxides of the present invention may be used as the polymerization catalysts either alone or in combination with one another or with other catalysts, such as benzoyl peroxide, lauroyl peroxide, acetyl peroxide, benzoyl acetyl peroxide and hydrogen peroxide. The catalysts of the invention are ordinarily dissolved in the polymerizable compounds prior to polymerization. Amounts of the catalysts, as small as a fraction of a percent based on the weight of the monomer, are catalytically effective. Larger percentages have correspondingly greater effect. Too much catalyst is generally to be avoided as likely to render the reaction violent, or as adversely affecting the properties of the polymer, particularly as to molecular weight and the ramifications thereof. The amount of catalyst ordinarily varies from about 0.01% to about 5% or more by weight of the monomer.

The polymerization may be carried out in a continuous or discontinuous manner, under atmospheric, superatmospheric or reduced pressures. The polymerization will usually be energized by the application of heat, although both heat and light may be used, and in some cases light alone is sufficient. The invention may be applied to monomeric compounds in the massive state or to dispersions or solutions of the monomer or monomers. Where the dispersion method is employed, it is normally desirable to select a dispersing medium insoluble in the catalyst involved. In general, the temperatures customary for similar polymerization reactions under the influence of other catalysts, e. g. benzoyl peroxide, may be used. Depending upon the particular material and the conditions involved, temperatures of from about room temperature to above 200° C. may be used. This usually, although not necessarily, involves the use of superatmospheric pressures.

The term "polymerizable unconjugated unsaturated compounds," as used herein and in the appended claims, refers to polymerizable unsaturated compounds which do not have in the molecule conjugated carbon-to-carbon unsaturated linkages between carbon atoms of aliphatic character.

We claim as our invention:

1. Ethyl tertiary-butyl peroxide.
2. A di-alkyl peroxide having the general formula $(CH_3)_3C-O-O-R$ wherein R represents a primary lower alkyl radical.
3. A di-alkyl peroxide having the general formula $(CH_3)_3C-O-O-R$ wherein R represents a non-tertiary lower alkyl radical.
4. A di-alkyl peroxide having the general formula $R-O-O-R'$ where R represents a lower tertiary alkyl radical, and wherein R' represents a lower primary alkyl radical.
5. A di-alkyl peroxide having the general formula $R-O-O-R'$ wherein R represents a lower tertiary alkyl radical, and wherein R' represents a lower non-tertiary alkyl radical.

FREDERICK F. RUST.
FRANK H. DICKEY.